US011635318B2

(12) United States Patent
Sanchez et al.

(10) Patent No.: US 11,635,318 B2
(45) Date of Patent: Apr. 25, 2023

(54) LN2 FILL GAUGE LEVEL INDICATING DEVICE

(71) Applicant: CRYOPORT, INC., Brentwood, TN (US)

(72) Inventors: Eden Sanchez, Bellflower, CA (US); Bret Bollinger, Yorba Linda, CA (US); Ben Lee, Corona, CA (US)

(73) Assignee: Cryoport, Inc., Brentwood, TN (US)

( * ) Notice: Subject to any disclaimer, the term of this patent is extended or adjusted under 35 U.S.C. 154(b) by 365 days.

(21) Appl. No.: 16/841,382

(22) Filed: Apr. 6, 2020

(65) Prior Publication Data

US 2021/0310849 A1 Oct. 7, 2021

(51) Int. Cl.
*G01F 23/24* (2006.01)
*G01F 23/00* (2022.01)
*G01F 23/02* (2006.01)

(52) U.S. Cl.
CPC ........ *G01F 23/242* (2013.01); *G01F 23/0015* (2013.01); *G01F 23/02* (2013.01)

(58) Field of Classification Search
CPC .... G01F 23/242; G01F 23/0015; G01F 23/02; G01F 23/0007
See application file for complete search history.

(56) References Cited

U.S. PATENT DOCUMENTS

2016/0003662 A1* 1/2016 Dayal .................... G01R 27/02
73/304 R

FOREIGN PATENT DOCUMENTS

| JP | 2002243522 A | 8/2002 |
| JP | 2011196417 A | 10/2011 |
| JP | 2020051449 A | 4/2020 |
| KR | 1020050115845 A | 12/2005 |

OTHER PUBLICATIONS

PCT; International Search Report & Written Opinion dated Jul. 22, 2021 in PCT Application No. US2021/025654.
PCT; International Preliminary Report on Patentability dated Oct. 6, 2022 in Application No. PCT/US2021/025654.

* cited by examiner

*Primary Examiner* — David Z Huang
(74) *Attorney, Agent, or Firm* — Snell & Wilmer L.L.P

(57) ABSTRACT

Method, system, apparatus, and/or device for determining when the dewar is filled with a medium. The fill gauge level apparatus includes a cylindrical body. The cylindrical body has a base on one end, a flange on an opposite open end and a cavity. The fill gauge level apparatus includes a fill gauge level device. The fill gauge level device is coupled to the cylindrical body and is positioned within the cavity. The fill gauge level devices includes a sensor for measuring a medium within a shipper. The fill gauge level devices includes an indicator. The indicator provides an indication when the medium has been filled to a threshold level within the shipper.

16 Claims, 6 Drawing Sheets

LN2 FILL GAUGE LEVEL INDICATING DEVICE

BACKGROUND

1. Field

This specification relates to a system, device or apparatus for an indicator to gauge the liquid nitrogen (LN2) level within a dry vapor shipper.

2. Description of the Related Art

In the shipping business, certain types of contents and cargo require extra special care. This need is apparent when shipping biological samples and specimens. Businesses, hospitals, labs and other research or consumer facilities need to ship biological material that is highly susceptible to cellular degradation, and so, they require cryogenic shipping services to ship the biological material at cryogenic temperatures at approximately −150 degrees Celsius. The shipping of these temperature controlled materials requires special equipment, such as a dry vapor shipper or dewar that is validated to maintain the cryogenic temperature for an extended period of time, to prevent or avoid cell degradation or loss. For example, a dry vapor shipper is a metallic flask that has a payload area or well that holds the biological material within at cryogenic temperatures for a long period of time to allow the transport of the biological material.

These dewars are very sensitive to environmental conditions, such as shock, vibration, age and thermal shock, all of which may cause damage to the construction of the dewar. Thus, it is necessary to mitigate these environmental conditions to reduce the possibility of premature failure of the vacuum inside the dewar.

For example, thermal shock may occur if the dewar is filled with liquid nitrogen (LN2) too rapidly because there are various materials of the dewar that are sensitive to the thermal shock. These materials all have different coefficients of thermal expansion and if the variation of these coefficients is too great cracking, separation or residual stress between the joints of these dissimilar materials may result. As a result, the dewar could lose its vacuum because of a breach in these materials or joints.

Since these various materials are extremely temperature and/or environmentally sensitive and to prevent such a breach, the dewar may be filled slowly to allow time for the materials to acclimate to the dramatic temperature shift from ambient to cryogenic temperatures. Preventing the LN2 level from contacting some of the joints between the dissimilar materials also helps to prevent breaches as well.

Accordingly, there is a need for a method, system, device or apparatus to slowly fill the dewar with LN2 and check the level of the LN2 to prevent contact of the LN2 with joints.

SUMMARY

In general, one aspect of the subject matter described in this specification is embodied in a fill gauge level apparatus. The fill gauge level apparatus includes a cylindrical body. The cylindrical body has a base on one end, a flange on an opposite open end and a cavity. The fill gauge level apparatus includes a fill gauge level device. The fill gauge level device is coupled to the cylindrical body and is positioned within the cavity. The fill gauge level device includes a sensor for measuring a medium within the shipper and an indicator. The indicator provides an indication when the shipper has been filled with a medium to a threshold level within the shipper.

These and other embodiments may optionally include one or more of the following features. The base of the cylindrical body may be a perforated base. The perforated base may be configured to allow a user to see through the perforated base and visually gauge when the medium has been filled to the threshold level even when the fill gauge level has failed. The flange may be a flanged ring that surrounds an outer periphery of the opposite open end of the cylindrical body. The bottom surface of the flanged ring may be lined with a material to protect the shipper and the flanged ring when the flanged ring is inserted and interfaces with the shipper.

The sensor may be configured to detect when the medium has been filled to the threshold level. The fill gauge level device may include a processor. The processor may be coupled to the sensor and the indicator. The processor may be configured to determine that the medium has been filled to threshold level. The processor may be configured to activate the indicator to indicate to the user that the shipper has been filled with the medium. The sensor may be configured to detect when the medium contacts the sensor. The indicator may be a visual indicator that signals that the medium is at the threshold level.

The fill gauge level device may include an elongated member. The elongated member may be inserted within a cavity of the cylindrical body and have a distal end that extends through an opening within the base of the cylindrical body. The fill gauge level device may include a sensor positioned at the distal end that may be configured to detect when the medium is at or above a threshold level. The fill gauge level device may include a sensor cover positioned around a length of the elongated member. The sensor cover may be configured to limit contact of the medium to the distal end and prevent the medium from contacting the rest of the length of the elongated member when the fill gauge level device is inserted within the shipper.

The fill gauge level apparatus may include one or more height adjusting bands. The one or more height adjusting bands may be coupled to the cylindrical body or the fill gauge level device. The one or more height adjusting bands may be configured to adjust a position of the cylindrical body or the fill gauge level device on or about a sidewall of the shipper.

In another aspect, the subject matter is embodied in a fill gauge level device. The fill gauge level device includes an elongated member. The elongated member has a distal end portion and is configured to extend through an opening within a cylindrical body positioned over a payload area of a shipper. The fill gauge level device includes a sensor positioned at the distal end portion of the elongated member. The sensor is configured to detect when a medium is at or above a threshold level within the payload area of the shipper. The fill gauge level device includes an indicator. The indicator is configured to indicate to a user when the medium is at the threshold level. The fill gauge level device includes a processor. The processor is coupled to the sensor and the indicator and configured to determine, using the sensor, that the medium is at the threshold level. The processor is configured to provide, using the indicator, an indication to the user that indicates that the medium is at the threshold level.

In another aspect, the subject matter is embodied in a fill gauge level system. The fill gauge level system includes a liquid nitrogen source that is configured to supply liquid nitrogen. The fill gauge level system includes a dewar having a payload area. The dewar is configured to receive the liquid nitrogen within the payload area. The fill gauge level system includes a fill gauge level apparatus. The fill gauge level apparatus is configured to be inserted within the dewar. The fill gauge level apparatus includes a cylindrical body. The cylindrical body has a base that is configured to be placed within the dewar on one end and a flange configured to limit a depth that the base is placed within the dewar on an opposite open end. The fill gauge level apparatus includes a fill gauge level device. The fill gauge level device is coupled to the cylindrical body and includes an indicator. The indicator is configured to provide an indication when the shipper has been filled with a medium to a threshold level.

In another aspect, the subject matter is embodied in a method. The method includes detecting or determining a level of a medium that is flowing into a dewar. The method includes determining that the level of the medium is or will be greater than or equal to a threshold level. The method includes providing an indication to a user that the level of the medium will or has reached the threshold level.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Figure 1:
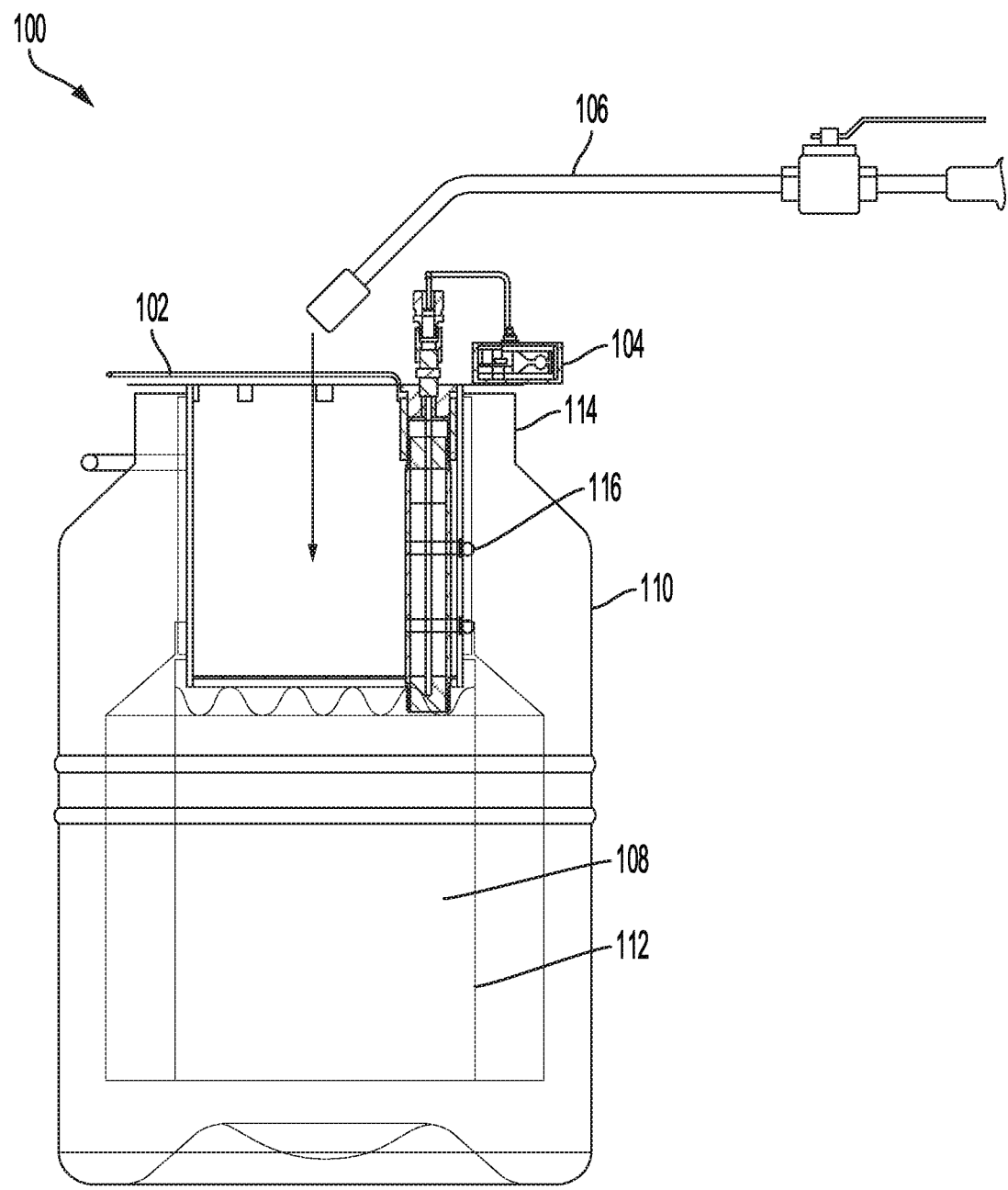
FIG. 1 shows an example shows a liquid nitrogen (LN2) fill gauge level indicating system according to an aspect of the invention.

Disclosed herein are systems, apparatuses and devices for filling liquid nitrogen (LN2) within a dewar or other dry vapor shipper. The LN2 fill gauge level indicating apparatus may provide one or more indicators to indicate when the level of the LN2 has reached a predetermined threshold level or other threshold level (hereinafter, referred to as "threshold level") within the dewar. Particular embodiments of the subject matter described in this specification may be implemented to realize one or more of the following advantages. When filling the dewar with LN2, the LN2 may form a gaseous or vaporous composition that obstructs the visual view of the operator. This may be due to the poor visibility that results from the LN2's natural tendency to evaporate when it is exposed to a temperature that is higher than its boiling point of −195.79° C. (77 K; −320° F.). With the obstructed view, the operator or other user is unable to determine when the LN2 has filled the payload area of the dewar to a threshold level. An LN2 fill gauge level indicating apparatus, however, may be integrated with or coupled to a neck of the dewar. The LN2 fill gauge level indicating apparatus may be inserted or placed within the neck and the payload area of the dewar. When inserted or placed within the payload area of the dewar, the LN2 fill gauge level indicating apparatus may measure, detect or otherwise determine when the LN2 has filled the payload area up to the threshold level. The LN2 gauge level indicating apparatus may determine when the LN2 has filled the payload area up to the threshold level automatically using one or more sensors and/or provide a manual indication of when the LN2 has filled the payload area up to the threshold level. In some implementations, the threshold level is user configured or predetermined. This allows the operator to accurately determine when the LN2 has been filled to the threshold level and when to shutoff the LN2 source to prevent the LN2 level from contacting some of the joints between dissimilar materials that may cause a breach.

Other benefits and advantages of the LN2 fill gauge level indicating apparatus include the capability of the LN2 fill gauge level indicating apparatus acting as a physical barrier between the dispensing nozzle of the LN2 source and the dewar when the LN2 fill gauge level indicating apparatus is placed within the dewar. As a physical barrier, the LN2 fill gauge level indicating apparatus prevents cross contamination of any biological contamination from the surface of the nozzle of the LN2 source.

Moreover, the LN2 fill gauge level indicating apparatus may automatically turn or shut off the LN2 source when the LN2 has been filled to the threshold level. Additionally, the LN2 fill gauge level indicating apparatus may predict when the LN2 will be filled to the threshold level, such that when the LN2 source is closed the remaining LN2 exiting the LN2 source will accurately fill the dewar up to but no more than threshold level. This allows for a more precise and accurate filling of the LN2 within the dewar.

Additionally, the LN2 fill gauge level indicating apparatus may have one or more height adjusting bands. These height adjusting bands allow the depth of the LN2 fill gauge level indicating apparatus within the dewar to be configured or adjusted to adjust the threshold level of LN2 needed within the dewar. Moreover, the size and shape of the LN2 fill gauge level indicating apparatus may be configurable to allow for the LN2 fill gauge level indicating apparatus to be fitted within differences sizes and shapes of necks of dewars.

FIG. 1 shows a liquid nitrogen (LN2) fill gauge level indicating system (or "fill gauge level system") 100. The fill gauge level system 100 includes an LN2 fill gauge level indicating apparatus (or "fill gauge level apparatus") 102, which includes a LN2 fill gauge level indicating device (or "fill gauge level device") 104, a dry vapor shipper, such as a dewar 110 and/or a fill device 106, such as a LN2 fill device or source, that outputs and provides a medium 108, such as LN2, to be placed or poured into and within the payload area 112 of the dewar 110.

The fill gauge level system 100 includes a dewar 110 or other dry vapor shipper. The dewar 110 may be a double-walled flask that has an inner wall and an outer wall. The dewar 110 may create a vacuum in between the inner and outer wall, which allows the space in between to be completely evacuated to insulate the materials stored. The dewar 110 may have an opening with a neck 114, which leads to a payload area 112 formed from the inner wall and that may store, hold or otherwise contain frozen biological materials, liquid and/or gases within and store the material at cryogenic temperatures.

The fill gauge level system 100 includes a fill device 106 or other medium source. The fill device 106 may be a LN2 fill device, which is a source that provides the medium 108, such as LN2, to pour into the payload area 112 of the dewar 110. The fill device 106 may have a nozzle or spigot that dispenses the medium 108. The medium 108 may be LN2, which is used to cool the contents within the payload area 112, and which may be filled to a threshold level. The threshold level may be a level that is slightly below or at the bottom of the neck 114 of the dewar 110 to prevent thermal shock to the perimeter of the inner wall of the neck 114 of the dewar 110. The fill device 106 may be opened, closed, partially opened or otherwise positioned to control an amount of flow of the medium 108 out of the fill device 106 and into the dewar 110. The fill device 106 may be controlled manually, such as by a user, and/or remotely, such as by the fill gauge level device 104. For example, in some implementations, the fill device 106 is operably coupled to the fill gauge level device 104 so that the fill gauge level device 104 may operate and/or communicate with the fill device 106 and automatically turned on or off.

Figure 2:
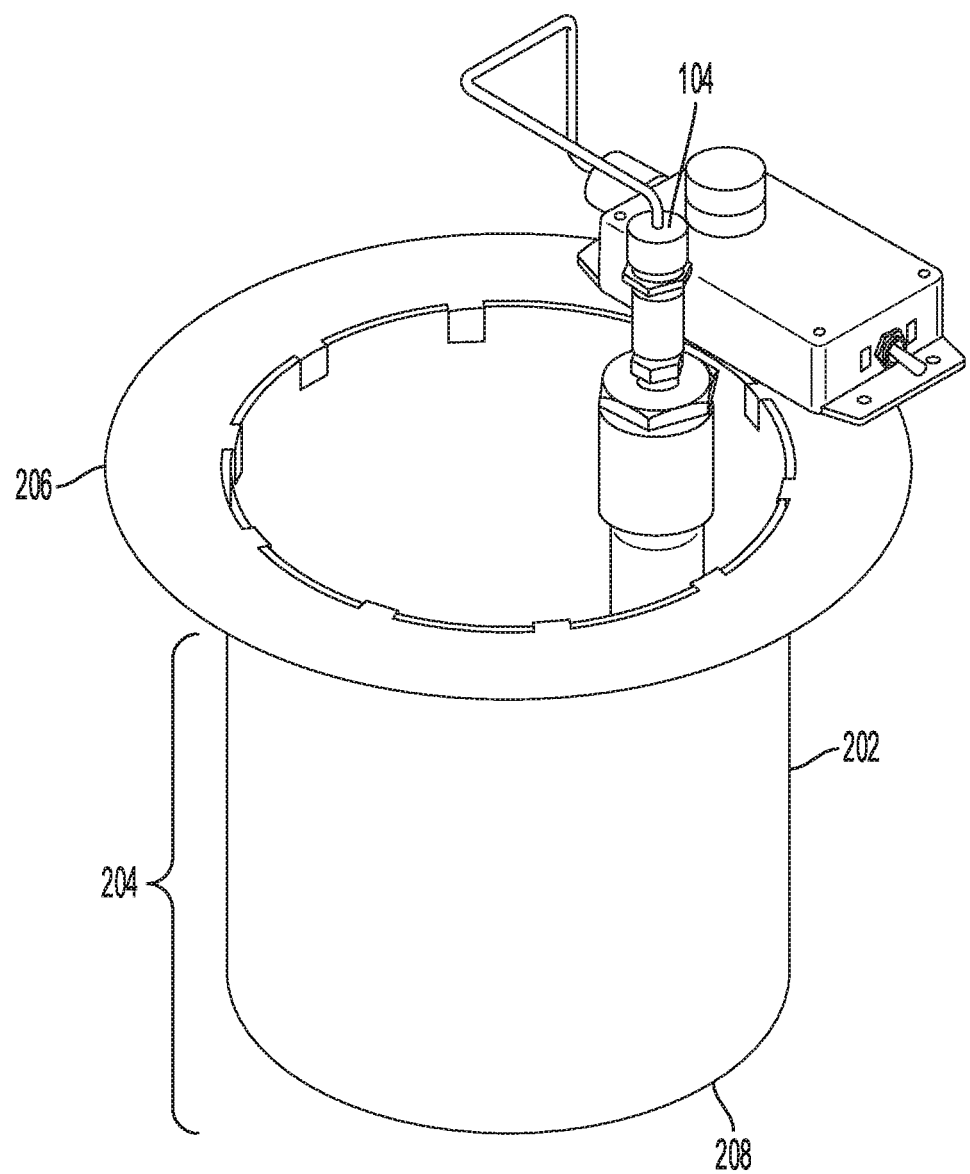
FIG. 2 shows an example LN2 fill gauge level indicating apparatus of the LN2 fill gauge level indicating system of FIG. 1 according to an aspect of the invention.

The fill gauge level system 100 has a fill gauge level apparatus 102. The fill gauge level apparatus 102 is positioned within the neck 114 of the dewar 110 such that a portion of the fill gauge level apparatus 102 is inserted and extends into the payload area 112 of the dewar 110. The fill gauge level apparatus 102 when positioned or inserted within the neck 114 of the dewar 110 acts as a physical barrier between the nozzle of the fill device 106 and the dewar 110 to prevent cross contamination of any biological contamination from the nozzle of the fill device 106. FIG. 2 shows the fill gauge level apparatus 102 decoupled from the dewar 110.

The fill gauge level apparatus 102 has a fill gauge level device 104 and an insert or body (hereinafter, referred to as "body") 202 that is positioned within a dewar 110 or other dry vapor shipper. The body 202 may be shaped as a cylinder, rectangular cube, or other polygonal shape to correspond and be similarly shaped as the inner perimeter of the inner wall the neck 114 and inner wall of the payload area 112 of the dewar 110 to accommodate dewars of various sizes and/or shapes.

The body 202 may have a bottom portion 204 and a top portion 206. The top portion 206 may be a flanged ring or otherwise protruding portion away from the body 202. The top portion 206 may define an opening that leads to a cavity within the bottom portion 204 of the body 202. The flanged ring or otherwise protruding portion extends outward from the body 202 and may have an outer perimeter or circumference with a diameter greater than the opening of the neck 114 of the dewar 110 so that the top portion 206 interfaces with and rests on top of the neck 114 of the dewar 110 when the body 202 is inserted within the dewar 110, as shown in FIG. 1 for example. A bottom surface of the flanged ring may be lined with a material to protect the dewar 110 and the flanged ring when the flanged ring is inserted and rests on the dewar 110.

The bottom portion 204 may be sized and shaped to be inserted into an opening within the neck 114 of the dewar 110 and may be slidably positioned within a top portion 206 of the payload area 112 of the dewar 110. The bottom portion 204 has a base 208 that may be positioned or inserted into the opening within the neck 114 of the dewar 110 and slidably positioned to rest within the payload area 112 of the dewar 110. The base 208 may be on an opposite end of the body 202 than the flanged ring.

Figure 3:
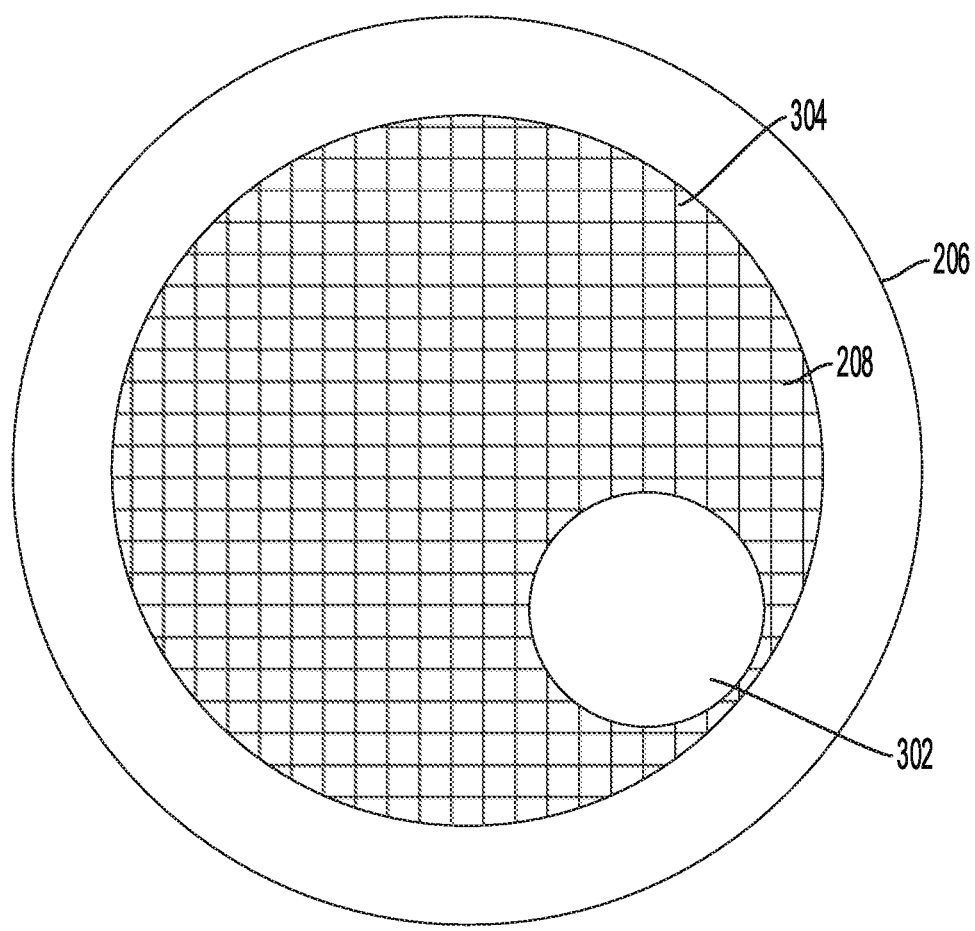
FIG. 3 shows a top-perspective view of the LN2 fill gauge level indicating apparatus of FIG. 2 according to an aspect of the invention.

The base 208 may be a perforated base and have an opening 302 within, as shown in FIG. 3 for example. The perforated base may be formed from a wire mesh 304 that has multiple openings that allow a user to visually see the contents within the dewar 110 when the fill gauge level apparatus 102 is placed or inserted within the dewar 110. Once the user identifies that the medium 108 has contacted the perforated base, this may indicate to the user to stop filling the medium 108 into the dewar 110 and to shut-off the fill device 106 even when the one or more sensors of the fill gauge level device 104 are not operational. Moreover, the perforated base allows the medium 108 poured or flowing from the fill device 106 to enter and fill the payload area 112 of the dewar 110. In some implementations, the base 208 may be transparent or semi-transparent allowing the user to see through the base 208.

The opening 302 allows the fill gauge level device 104 to be inserted into the payload area 112 of the dewar 110, such that a bottom portion of the fill gauge level device 104 extends or protrudes through the opening 302 into the payload area of the dewar. This exposes a sensor to the contents within the payload area of the dewar 110.

The base 208 may be positioned to align with the sensor of the fill gauge level device 104 and/or the desired threshold level of the medium 108 of which the user desires to fill the dewar 110. The perforated base allows for the medium 108 to flow and/or be poured in through the cavity and out the base 208 of the body 202 into the payload area 112 of the dewar 110 when the body 202 is inserted into the dewar 110. Additionally, the perforated base allows an operator of the fill gauge level indicating apparatus or other user to seethrough the base 208 to visually identify the level or amount of medium 108 that has been poured into the payload area 112 of the dewar 110. Since the base 208 is aligned with the desired threshold level of medium 108 of which the user desires, when the level or amount of medium 108 within the payload area 112 of the dewar 110 meets or exceeds the surface of the perforated base, this may indicate that the medium has filled past the base 208, has contacted a sensor of an LN2 fill gauge level device 104 and/or has filled to the desired threshold level. Thus, the perforated base allows for a manual visual indication of the level or amount of the medium 108 within the payload area 112 of the dewar 110 even when there is no power supplied to the fill gauge level device 104 and/or the fill gauge level device 104 is not operating properly. This advantageously provides a backup or a fail safe alternative to identify when the dewar 110 has been filled.

The fill gauge level system 100 may include one or more height adjusting bands 116 or other height adjusting mechanism. The one or more height adjusting bands 116 may be coupled to, included within or interface with the fill gauge level apparatus 102. The one or more height adjusting bands 116 may provide an interface between the body 202 of the fill gauge level apparatus 102 and an inner surface of the dewar 110, such as along a length of the neck 114 or a sidewall of the dewar 110, to adjust the height, depth or position of the fill gauge level apparatus 102 relative to the payload area 112 of the dewar 110. An actuator or other motor may move the one or more height adjusting bands 116 to move or position the fill gauge level apparatus 102 upwards or downwards to adjust a height of the fill gauge level apparatus 102 within the payload area 112 of the dewar 110. The one or more height adjusting bands 116 may be controlled manually and/or automatically by a controller, such as a processor within the fill gauge level device 104, to adjust the height or position of the fill gauge level apparatus 102 relative to the dewar 110, such as via user input or based on sensor readings of the height or depth of the dewar 110.

In some implementations, the one or more height adjusting bands 116 may be a clamp positioned or fastened along a track. The one or more height adjusting bands 116 may be loosened or unfastened so that the user may adjust the height of the one or more adjusting bands, and then, tightened or fastened to the track to secure the one or more height adjusting bands so that the fill gauge level apparatus 102 is fixed at a height.

The fill gauge level apparatus 102 includes a fill gauge level device 104. The fill gauge level device 104 may be positioned on an inner periphery or perimeter of the body 202 of the fill gauge level apparatus 102. The fill gauge level device 104 may extend downward through the cavity of the body 202 and through the opening 302 within the base 208 of the body 202 and into the payload area 112 of the dewar 110 when the fill gauge level apparatus 102 is inserted into the dewar 110.

Figure 4:
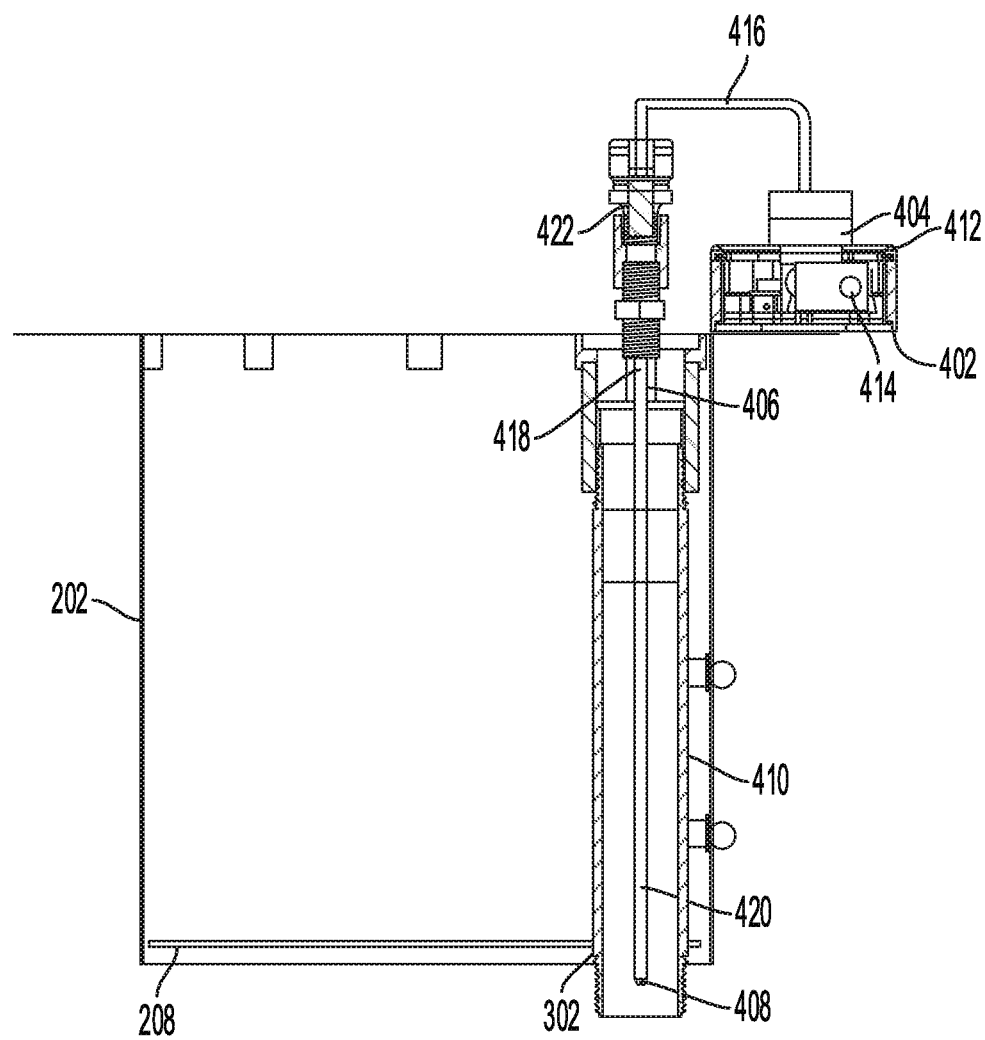
FIG. 4 show an example schematic diagram of a cross-sectional view of the LN2 fill gauge level indicating apparatus of the LN2 fill gauge level indicating system of FIG. 1 according to an aspect of the invention.

FIG. 4 shows a cross-sectional view of the fill gauge level apparatus 102 with the fill gauge level device 104 positioned within. The fill gauge level device 104 may be rigidly coupled to the fill gauge level apparatus 102, such as along the sidewall of the body 202 or at the top portion 206. The fill gauge level device 104 includes a housing 412, a processing circuitry 402, one or more indicators 404, an elongated member 406 and/or one or more sensors 408. The fill gauge level device 104 may have a sensor cover or splash guard (hereinafter, referred to as "sensor cover") 410 and/or a switch 414.

The fill gauge level device 104 may have a housing 412. The housing 412 may be a metal or other encasing that encloses or surrounds one or more electrical components of the fill gauge level device 104 including the processing circuitry 402, the circuitry of the one or more indicators 404 and/or the switch 414, and/or wiring that electrically couples the processing circuitry 402 with the one or more sensors 408. The housing 412 protects the electrical components from the environment including the medium 108 when the medium 108 is flowing from the fill device 106 into the dewar 110. The housing 412 may be positioned on the top portion 206, such as along a top surface of the flanged portion that protrudes outward from the body 202 and defines the opening into the cavity of the body 202 so that medium 108 pouring into the cavity of the body 202 does not spill onto the housing 412.

The fill gauge level device 104 has an elongated member 406 and/or a connector 422. The housing 412 may be coupled to the elongated member 406 via a member 416, such as a pipe, duct, vessel or other passageway, and/or the connector 422. The member 416 may enclose or surround wiring that electrically couples the processing circuitry 402 and the one or more sensors 408. The connector 422 may provide an interface between the member 416 and the elongated member 406. The connector 422 may receive or fasten onto the elongated member 406. The elongated member 406 may be a hollow metal tube that surrounds or encloses the wiring to protect the wiring from the medium 108 and/or the environment when the wiring traverses distally toward the one or more sensors 408 along the sidewall of the dewar 110 and within the dewar 110.

The elongated member 406 has a proximal end 418, a distal end 420 and a longitudinal length in between that extends downward into the cavity of the body 202 and through the opening 302 of the base 208 of the body 202. The proximal end 418 may be positioned at the top of the cavity of the body 202 near the opening and may be fastened to the member 416 via the connector 422. The wiring that electrically couples the processing circuitry 402 and the one or more sensors 408 may enter through the proximal end 418 of the elongated member, travel down the longitudinal length of the elongated member 406 and couple to the one or more sensors 408, which may be positioned at the distal end 420 of the elongated member 406. The distal end 420 of the elongated member 406 may be positioned through the opening 302 and below the base 208 into the payload area 112 of the dewar 110.

The fill gauge level device 104 has one or more sensors 408. The one or more sensors 408 may be a voltage sensor that changes resistance when the voltage sensor contacts the medium 108. The one or more sensors may be another type of sensor, such as a light detection and ranging (LIDAR) sensor, optical sensor, radar, infrared, radio wave or other sensor that can measure or determine a distance to a target or a presence or a lack of presence of the target. For example, a LIDAR sensor, optical sensor and/or radar may emit an electromagnet wave that is reflected when the wavelength contacts the target to identify the presence of the target. The LIDAR sensor, optical sensor and/or radar may then measure the return time of reflected wavelengths to determine the relative distance to the target, such as the surface of the medium 108 within the dewar 110.

The one or more sensors 408 may be positioned at the distal end 420 of the elongated member 406 so that the one or more sensors 408 may detect when the medium 108 reaches the threshold level. The one or more sensors 408 are coupled to wiring that is within the elongated member 406 to provide the signal that detects the medium 108 to the processing circuitry 402 within the housing 412. In some implementations, the one or more sensors 408 may include multiple sensors positioned along the length of the elongated member 406. Each sensor 408 may be spaced apart and positioned at a different height along the length of the elongated member 406. And as the level of the medium 108 increases and contacts each sensor 408, the corresponding sensor 408 provides a signal to the processing circuitry 402 to indicate which of the multiple sensors 408 have been activated, and thus, providing the height or the level of the medium 108 within the payload area 112 of the dewar 110.

The fill gauge level device 104 may include a sensor cover 410. The sensor cover 410 may be positioned around the length of the elongated member 406. The sensor cover 410 may entirely or partially circumferentially surround the entire length or a portion of the length of the elongated member 406 while leaving a bottom opening for the distal end 420 of the elongated member 406 with the one or more sensors 408 exposed. The sensor cover 410 may have a threaded fitting on one or more ends of the sensor cover 410 to allow for fastening of the sensor cover 410 to another component, such as a nut. The sensor cover 410 limits contact of the medium 108 to the distal end 420 and prevents the medium 108 from contacting the sides of the remainder of the length of the elongated member 406 when the fill gauge level device 104 is inserted within the dewar 110. This allows the medium 108 to contact the one or more sensors 408 while simultaneously protecting the rest of the length of the elongated member 406 from the splashing of the medium 108 during delivery. The sensor 408 may or may not be positioned planar with the bottom opening of the sensor cover 410. The bottom opening of the sensor cover 410 may or may not be altered to allow the medium 108 to travel within or between the walls of the sensor cover 410 and/or within a cavity formed by the sensor cover 410.

Figure 5:
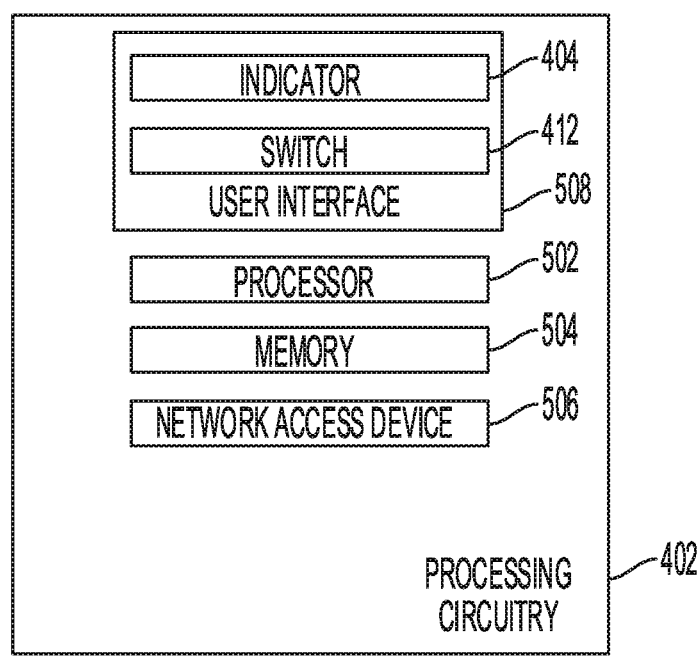
FIG. 5 shows an example block diagram of the processing circuitry of the LN2 fill gauge level indicating apparatus of the LN2 fill gauge level indicating system of FIG. 1 according to an aspect of the invention.

The fill gauge level device 104 may include processing circuitry 402. The processing circuitry 402 may be housed within the housing 412, which protects the processing circuitry 402 from the environment including any medium 108 flowing from the fill device 106. The processing circuitry 402 may include multiple components, such a processor 502, a memory 504, adjustable circuitry, a network access device 506, as shown in FIG. 5 for example. The processing circuitry 402 may include circuitry for the indicator 404, the switch 414 and/or other types of user interfaces 508.

The processor 502 may be implemented as a single processor or as multiple processors. The processor 502 may be a microprocessor, data processor, microcontroller or other controller, and may be electrically coupled to some or all the other components within the processing circuitry 402. The processor 502 control the indicator 404, the switch 414, the one or more sensor 408 and/or other components to determine when the medium 108 is at the threshold level. The processor 502 may be coupled to the memory 504.

The memory 504 may be coupled to the processor 502 and store instructions that the processor 502 executes. The memory 504 may include one or more of a Random Access Memory (RAM), Read Only Memory (ROM), USB storage device or other volatile or non-volatile memory. The memory 504 may be a non-transitory memory or a data storage device, such as a hard disk drive, a solid-state disk drive, a hybrid disk drive, or other appropriate data storage, and may further store machine-readable instructions, which may be loaded and executed by the processor 502.

The network access device 506 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 506 may transmit data to and receive data from the fill gauge level device 104 and the fill device 106. For example, the fill gauge level device 104 may use the network access device 506 to communicate with the fill device 106, such as to turn-on, turn-off or otherwise control the flow of the medium 108 from the fill device 106.

The fill gauge level device 104 may include or be coupled to a user interface 508. The user interface 508 may include an input/output device that receives user input from a user interface element, a button, a dial, a microphone, a keyboard, a switch, such as the switch 414, or a touch screen. The user interface 508 may provide an output to an output device, such as a display, a speaker, an indicator, such as the indicator 404, which may be an audio and/or visual indicator, or a refreshable braille display.

The user interface 508 may receive user input that adjusts the height of the fill gauge level device 104 and/or the fill gauge level apparatus 102 along the sidewall of the dewar 110. The user input may cause the processing circuitry 402 to control the one or more height adjusting bands 116 to adjust the height, and consequently, the threshold level of the medium 108 that needs to be reached to activate or trigger the one or more sensors 408.

The user interface 508 may provide notifications to the user or other operator, such as when the level of the medium 108 reaches or exceeds the threshold level. The user interface 508 may display statistics calculated from the level of the medium 108, such as the rate of flow of the medium 108 into the dewar 110, the amount of medium 108 within the dewar 110 and/or other statistics related to filling the dewar 110 with the medium 108. The user interface 508 may also display alerts, such as the need to shutoff the flow of the medium 108 from the fill device 106.

The fill gauge level device 104 may include an indicator 404. The indicator 404 may be an audio indicator and/or a visual indicator, such as a light. The indicator 404 may activate and indicate when the one or more sensors 408 indicate that the level of the medium 108 has reached the threshold level, such as when the medium 108 contacts the one or more sensors 408.

The fill gauge level device 104 may include a switch 414. The switch 414 may be an on-off switch that when in an on position allows power to turn-on the processing circuitry 402 and when in an off position cuts-off power to turn-off the processing circuitry 402. When the processing circuitry 402 is turned-on, the processing circuitry 402 operates the one or more sensors 408 to detect the medium 108 and the indicator 404 to indicate when the one or more sensors 408 detect that the medium 108 is at the threshold level. When the processing circuitry 402 is turned-off, the one or more sensors 408 are not active and are unable to detect the medium 108 and the indicator 404 is off.

Figure 6:
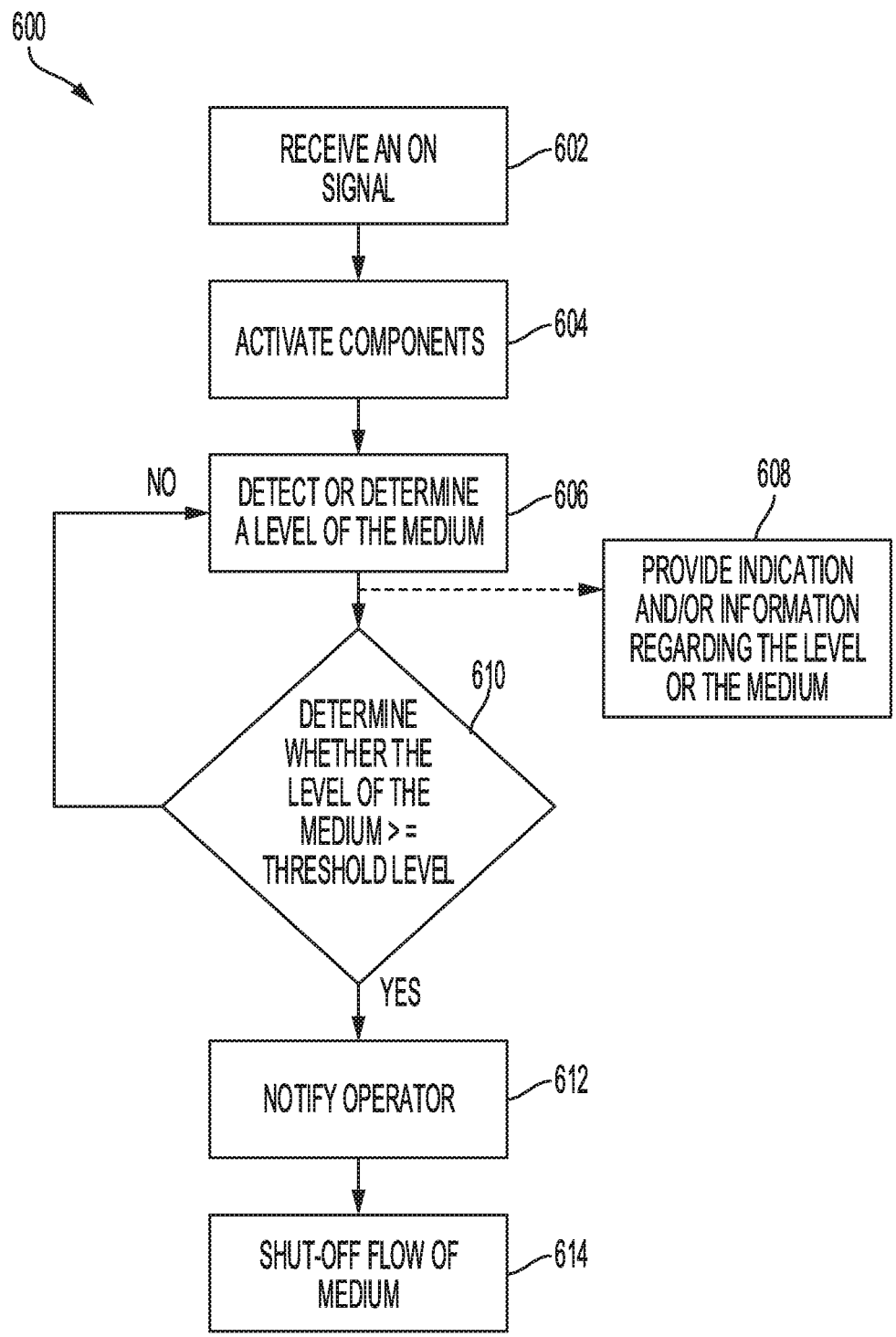
FIG. 6 is a flow diagram of an example process for controlling the level of the medium within the dewar of the LN2 fill gauge level indicating system of FIG. 1 according to an aspect of the invention.

FIG. 6 is a flow diagram of a process 600 for detecting or determining the level of medium 108 within the dewar 110. One or more computers or one or more data processing apparatuses, for example, the processing circuitry 402 of the fill gauge level device 104 of the fill gauge level system 100 of FIG. 1, appropriately programmed, may implement the process 600.

The fill gauge level system 100 has a fill gauge level device 104. The fill gauge level device 104 may receive an on signal to activate the fill gauge level device 104 (602). The fill gauge level device 104 may receive the on signal from the switch 414, e.g., when the user toggles the switch 414 from the off position to the on position, or via another user interface element on the user interface 508, such as via user input. When the fill gauge level device 104 receives the on signal, the fill gauge level device 104 may activate the various components of the fill gauge level device 104, such as the one or more sensors 408 and/or the indicator 404 (604).

Once the components are activated, the fill gauge level device 104 may detect or determine a level of the medium that is flowing in and/or has flowed into the payload area 112 of the dewar 110 (606). The fill gauge level device 104 may use the one or more sensors 408 to determine or measure the level of the medium 108 within the payload area 112. The fill gauge level device 104 may calculate the rate of change of the level of the medium 108 based on the measurements of the level of the medium 108 within the payload area 112 over time. The rate of change of the level of the medium 108 may correspond to an amount or a rate of medium 108 that is flowing into the payload area 112 from the fill device 106. And thus, the fill gauge level device 104 may determine both the amount and rate of medium 108 that is flowing in and the amount or level of the medium 108 within the payload area 112 of the dewar 110.

The fill gauge level device 104 may provide an indication and/or information regarding the level of the medium 108 to a user or operator (608). The fill gauge level device 104 may provide the indication and/or the information to the user or the operator via the user interface 508, which may be included within or remotely coupled to the fill gauge level device 104. The information may include an amount or rate that the medium 108 is flowing into the dewar 110 and/or the amount or rate that the medium 108 is being filled within the dewar 110.

The fill gauge level device 104 may determine, estimate or predict whether the level of the medium 108 is or will be greater than or equal to the threshold level (610). The fill gauge level device 104 may determine that the level of the medium 108 is greater than or equal to the threshold level using the one or more sensors 408 even when the view of the user is obstructed from seeing into the dewar 110, such as by gas or vapor originating from the medium 108. The fill gauge level device 104 may use other factors such as the amount or rate that the medium 108 is being filled and/or is flowing into the dewar 110 to determine when the level of the medium 108 will reach or exceed the threshold level. For example, the fill gauge level device 104 uses the rate or amount of medium 108 that is flowing into the payload area 112 of the dewar 110 and the amount of medium 108 that is already within the payload area 112 of the dewar 110 to determine or predict the anticipated level of the medium 108 if the fill device 106 were to be shut-off And once, the anticipated level of the medium 108 reaches or exceeds the threshold level, the fill gauge level device 104 determines that level of the medium 108 will or has reached the threshold level. In some implementations, the user may view through the perforated base and determine that the level of the medium has or will reach the threshold level.

For example, when the medium 108 contacts the one or more sensors 408 this may indicate that the level of the medium is at the threshold level. In another example, the fill gauge level device 104 sums the current level or amount of medium 108 within the dewar 110 with the estimated amount of medium 108 that is flowing into the dewar 110 to determine whether the level of medium 108 will be greater than or equal to the threshold level. This allows for the fill gauge level device 104 to include the amount that is flowing into the dewar 110 with the amount that is already in the dewar 110 to more accurately determine when the level of the medium 108 will reach the threshold level within the dewar 110.

When the level of the medium 108 will not or has not reached the threshold level, the fill gauge level device 104 may continue to detect or determine the level of the medium 108 and allow the medium 108 to continue to flow into the dewar 110 (606). When the level of the medium 108 will reach or has reached the threshold level, such as when the level of the medium 108 is or will be greater than the threshold level and/or when the medium 108 contacts the one or more sensors 408, the fill gauge level device 104 may notify the user or other operator to turn-off or shut-off the flow of the medium 108 and indicate that the dewar 110 is full (612). The fill gauge level device 104 may activate the indicator 404 to signal the user that the dewar 110 is full and/or provide an indication via the network access device 506 to a user device and/or through the user interface 508. The indicator 404 may be a visual indicator, such as a flashing light, and/or an audio indicator, such as an audio beacon.

The fill gauge level device 104 may shut-off or close the flow of the medium 108 from the fill device 106 (614). The fill gauge level device 104 may send a signal to the fill device 106 to shut-off the flow of the medium 108 to the dewar 110 to prevent additional medium 108 from flowing into the payload area 112 of the dewar 110.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A fill gauge level apparatus, comprising:
   a cylindrical body having a base on one end, a flange on an opposite open end and a cavity;
   a fill gauge level device coupled to the cylindrical body and positioned within the cavity, the fill gauge level device including:
   a sensor for measuring a medium within a shipper, and
   an indicator that provides an indication when the medium has been filled to a threshold level within the shipper; and
   one or more height adjusting bands coupled to the cylindrical body or the fill gauge level device and configured to adjust a position of the cylindrical body or the fill gauge level device relative to a sidewall of the shipper.

2. The fill gauge level apparatus of claim 1, wherein the base of the cylindrical body is a perforated base, wherein the perforated base is configured to allow a user to see through the perforated base and visually gauge when the medium has been filled to the threshold level even when the fill gauge level device has failed.

3. The fill gauge level apparatus of claim 1, wherein the flange is a flanged ring that surrounds an outer periphery of the opposite open end of the cylindrical body, wherein a bottom surface of the flanged ring is lined with a material to protect the shipper and the flanged ring when the flanged ring is inserted and interfaces with the shipper.

4. The fill gauge level apparatus of claim 1, wherein the fill gauge level device includes:
   a processor coupled to the sensor and the indicator and configured to:
   determine, using the sensor, that the medium has been filled to the threshold level, and
   activate the indicator to indicate to a user that the shipper has been filled with the medium.

5. The fill gauge level apparatus of claim 4, wherein the sensor is configured to detect when the shipper has been filled with the medium to the threshold level and contacts the sensor.

6. The fill gauge level apparatus of claim 1, wherein the indicator is a visual indicator that signals that the medium is at the threshold level.

7. The fill gauge level apparatus of claim 1, wherein the fill gauge level device includes:
   an elongated member inserted within the cavity of the cylindrical body and having a distal end that extends through an opening within the base of the cylindrical body, wherein the sensor is positioned at the distal end of the elongated member and configured to detect when the medium is at or above the threshold level; and
   a sensor cover positioned around a length of the elongated member and configured to limit contact of the medium to the distal end and prevent the medium from contacting a remainder of the length of the elongated member when the fill gauge level device is inserted within the shipper.

8. A fill gauge level device, comprising:
   an elongated member having a distal end portion and configured to extend through an opening within a cylindrical body positioned over a payload area of a shipper;

a sensor positioned at the distal end portion of the elongated member and configured to detect when a medium is at or above a threshold level within the payload area of the shipper;

an indicator configured to indicate to a user when the medium is at the threshold level; and a processor coupled to the sensor and the indicator and configured to:

determine, using the sensor, that the medium is at the threshold level;

provide, using the indicator, an indication to the user that indicates that the medium is at the threshold level; and adjust or move one or more height adjusting bands in contact with a sidewall of the shipper to change or move the fill gauge level device relative to the sidewall of the shipper and adjust the threshold level necessary to trigger the indicator.

9. A fill gauge level device, comprising:

an elongated member having a distal end portion and configured to extend through an opening within a cylindrical body positioned over a payload area of a shipper;

a sensor positioned at the distal end portion of the elongated member and configured to detect when a medium is at or above a threshold level within the payload area of the shipper;

an indicator configured to indicate to a user when the medium is at the threshold level; and a processor coupled to the sensor and the indicator and configured to:

determine, using the sensor, that the medium is at the threshold level, provide, using the indicator, an indication to the user that indicates that the medium is at the threshold level;

shut, close, or turn off a flow of the medium from a medium source when the medium is within a threshold amount of the threshold level; and estimate an amount of medium that has flowed from the medium source but has not reached the payload area of the shipper, wherein the threshold amount is greater than 0 and is equivalent to the estimated amount.

10. The fill gauge level device of claim 9, further comprising:

a sensor cover positioned around a length of the elongated member and configured to limit contact of the medium to the distal end portion and prevent the medium from contacting a remainder of the length of the elongated member.

11. The fill gauge level device of claim 9, wherein the indicator is a visual indicator that signals that the medium is at the threshold level.

12. The fill gauge level device of claim 9, wherein to detect when the medium is at the threshold level the sensor is configured to detect when the medium contacts the sensor.

13. The fill gauge level device of claim 9, further comprising:

a housing configured to enclose or surround the processor; and a switch coupled to the housing and configured to activate or deactivate the fill gauge level device.

14. A fill gauge level system, comprising:

a liquid nitrogen source that is configured to supply liquid nitrogen;

a dewar having a payload area and configured to receive the liquid nitrogen within the payload area;

a fill gauge level apparatus configured to be inserted within the dewar and including:

a cylindrical body having a base configured to be placed within the dewar on one end and a flange configured to limit a depth that the base is placed within the dewar on an opposite open end; and a fill gauge level device coupled to the cylindrical body and including:

an indicator configured to provide an indication when a shipper has been filled with a medium to a threshold level, wherein the fill gauge level apparatus includes one or more height adjusting bands coupled to the cylindrical body or the fill gauge level device and configured to move the cylindrical body or the fill gauge level device vertically along a sidewall of the dewar.

15. The fill gauge level system of claim 14, wherein the fill gauge level device includes a processor and a sensor, wherein the processor is coupled to the sensor and the indicator and configured to:

determine, using the sensor, that the liquid nitrogen is at or above the threshold level, and provide, using the indicator, an indication to a user that indicates that the liquid nitrogen is at or above the threshold level.

16. The fill gauge level system of claim 15, wherein the processor is configured to:

shut, close, or turn off a flow of the liquid nitrogen from the liquid nitrogen source when the liquid nitrogen is within at or above the threshold level.

* * * * *